United States Patent [19]

Sir

[11] Patent Number: 5,025,715

[45] Date of Patent: Jun. 25, 1991

[54] COOKING APPARATUS

[76] Inventor: John Sir, 9261 Skyway, Paradise, Calif. 95969

[21] Appl. No.: 621,381

[22] Filed: Nov. 30, 1990

[51] Int. Cl.$^5$ .................. A47J 33/00; A47J 37/04; F16M 11/00; F16M 13/00
[52] U.S. Cl. .................. 99/421 HV; 99/449; 99/450; 126/9 R; 126/30; 248/165; 248/168
[58] Field of Search ............ 99/339, 340, 419, 421 R, 99/421 A, 421 H, 421 HH, 421 HV, 448, 449, 450, 482; 126/9 R, 9 B, 25 R, 30; 248/165, 168, 170, 163.2

[56] References Cited

U.S. PATENT DOCUMENTS

| | | | |
|---|---|---|---|
| 102,886 | 5/1870 | Unglish | 248/163.2 |
| 955,140 | 4/1910 | Cronk . | |
| 1,866,175 | 7/1932 | Rogers, Jr. | 248/168 |
| 2,832,555 | 4/1958 | Terhune | 248/170 |
| 3,180,602 | 4/1965 | Monell | 248/170 |
| 3,963,207 | 6/1976 | Guasti | 248/168 |
| 4,024,851 | 5/1977 | Boda . | |
| 4,112,832 | 9/1978 | Severdia et al. | 99/421 HV |
| 4,120,280 | 10/1978 | Iverson et al. . | |
| 4,146,010 | 3/1979 | Manska | 126/30 |
| 4,320,700 | 3/1982 | Stachowicz | 99/421 HV |
| 4,719,898 | 1/1988 | Stanislawski | 126/9 R |
| 4,732,138 | 3/1988 | Vos . | |
| 4,832,296 | 5/1989 | Schnepp | 248/168 |
| 4,892,032 | 1/1990 | Jerome | 99/421 HV |

FOREIGN PATENT DOCUMENTS

| | | | |
|---|---|---|---|
| 667627 | of 1927 | Australia | 126/30 |
| 1090669 | 12/1980 | Canada . | |
| 12666 | of 1891 | United Kingdom | 126/30 |

Primary Examiner—Timothy F. Simone

[57] ABSTRACT

A tripod stand structured for supporting food holding equipment over a fire pan containing a fire, or an open campfire. The tripod has three support legs, each formed of a plurality of separable sections which snap together. The upper portion of each leg is hingedly affixed to a central collar. The central collar further defines a central bore structured for retaining a vertically oriented center rigid shaft. The lower end of the center rigid shaft is structured for releasably supporting one of several food holding accessories such as a grill, a battery powered rotisserie or a shish kebob apparatus over the fire. The central collar allows the center rigid shaft to be removed or variably adjusted in height over a wide range. Temporary stationary affixment of the center rigid shaft within the central collar is made with the use of a threadably engaged L-shaped handle, one end of which extends through a threaded bore in the sidewall of the central collar. With the center rigid shaft removed from the central collar, a vertical slot within the sidewall of the collar is exposed for releasably and adjustably retaining one end of a length of chain. The distal end of the chain is affixed with a hook for suspending a cooking pot. The tripod stand and food holding equipment can be easily disassembled and stored within the provided fire pan, which in turn can then be stored within a handled fabric carrying case.

13 Claims, 6 Drawing Sheets

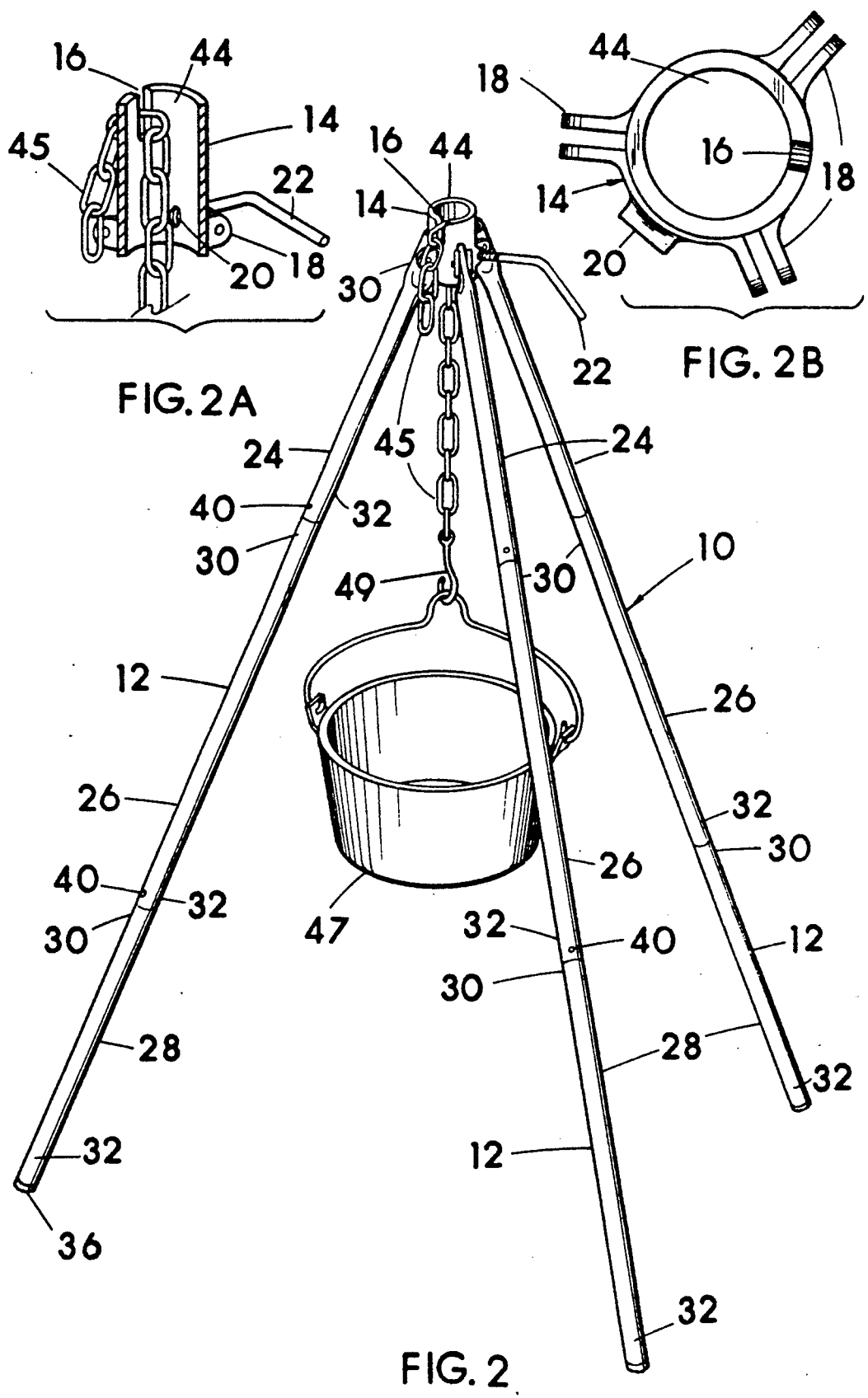

COOKING APPARATUS

BACKGROUND OF THE INVENTION

1. Field of the Invention:

This invention relates to a portable outdoor barbecuing or cooking apparatus which utilizes a breakdown tripod stand to removably support a vertically oriented and adjustably positionable elongated rigid central shaft. The lower end of rigid central shaft is structured to removably retain various types of cooking apparatuses designed to hold food over a fire.

2. Description of the prior Art:

Numerous tripod cooking devices have been developed in the past, although none are seen to be structured the same, or as providing all of the advantages of the present invention. Some of the problems associated with similar past art cooking devices which the present invention solves, include: compact storage of the structure when not in use, ease of transporting from place to place, ease of adjusting the height of the food holding equipment above a fire, stability of the food holding equipment over the fire even during the process of adjusting the height, and structuring allowing various types of food holding equipment to be used with a single tripod stand.

SUMMARY OF THE INVENTION

The invention of this disclosure is a portable cooking apparatus sufficiently light in weight, being under 13 kilograms so as to be able to be easily carried by a single adult. A preferred structure of the invention is comprised of a tripod stand structured for placement over a provided fire pan containing a charcoal or wood fire, or for placement directly over an open campfire. The tripod has three elongated tubular support legs, each of which is formed of a plurality of separable sections which endwardly affix together with internal spring biased holding snaps. The upper portion of each leg is hingidly affixed to a central support collar. The central collar further defines a central vertically oriented bore structured for removably retaining a vertically oriented elongated center rigid shaft. In use, the center rigid shaft is positioned over the campfire or fire pan. The lower end of the center rigid shaft is structured for releasably supporting one of several cooking accessories such as a grill, a battery powered rotisserie and a shish kebob apparatus, also rotatably powered. The central collar allows the elongated center rigid shaft to be slidably adjusted vertically over a wide range, allowing for various spacial distances between the cooking accessories holding the food, and the heat source. Temporary stationary affixment of the center rigid shaft is made with the use of a threadably engaged handled rod, one threaded end of which extends through a horizontally disposed threaded bore in the sidewall of the central collar to apply pressure to the center rigid shaft thereby pressing it against the central collar.

Height adjustments in the food holding accessories over a fire can be easily made with two hands, one hand operating the handled rod to slidably free the center rigid shaft, and the other hand grasping the upper end of the center rigid shaft to make the height adjustments prior to tightening the handled rod.

The food holding accessories remain stable during the height adjustments due to the rigidity of the center rigid shaft and its tight, but slidable fit within the central collar. Furthermore, the bore in the central collar and the center rigid shaft are both round, an arrangement which allows the rigid shaft to be rotated within the collar to easily rotate food cooking over hotter or cooler areas of the fire without the necessity of height adjustment.

With the center rigid shaft removed from the central collar, a vertical open ended slot within the sidewall of the collar is exposed for releasably and adjustably retaining one end of a length of chain. The lower or distal end of the chain is affixed with a hook for suspending a cooking pot over the fire if desired.

The provided fire pan is comprised of an annular metal dish having three short detachable legs, and an accessory wind breaker which is removably and adjustably attached to the top edge of the pan. The wind breaker when detached from the top edge of the fire pan fits within the pan for storage.

The cooking apparatus can be easily disassembled into small separate segments, coupled with the upper three leg segments attached to the central collar being able to be pivoted inward, allows for easy, compact storage of the parts within the annular fire pan. The fire pan can then be stored within a handled fabric carrying case provided for clean and easy transportation of the cooking apparatus.

Therefore, one major object of the invention is to provide an improved tripod cooking apparatus which can be disassembled into a small, easily stored and transported unit.

Another object of the invention is to provide the above in a tripod cooking apparatus which has a variety of readily interchangeable cooking or food holding accessories.

A further object of the invention is to provide the above in a tripod cooking apparatus which allows for simple and quick height variation of the food holding accessories in relation to the heat source.

A still further object of the invention is to provide the above in a tripod cooking apparatus where the grill or other food holding accessories attachable to the center rigid shaft are held stationary against lateral movement by the rigid shaft for increased stability thereof even during the process of adjusting the height of the food cooking over the fire, this being to prevent the inadvertent falling or rolling off of items such as wieners or a coffee pot for example.

Another object of the invention is to provide the above in a tripod cooking apparatus which can be used over an open campfire as well as the provided fire pan.

An even further object of the invention is to provide the above in a tripod cooking apparatus which does not require the use of tools other than human hands for assembly or disassembly, and is therefore simple to assemble and disassemble in remote areas such as campgrounds.

For a better understanding of the invention, the operation and further advantages thereof, reference is made to the accompanying drawings and remaining specification where a preferred embodiment of the invention is shown and described in detail for example.

BRIEF DESCRIPTION OF THE DRAWINGS

FIG. 2 is a perspective view of the tripod stand of FIG. 1, with the center rigid shaft removed, and the central collar supporting a chain and cooking pot.

FIG. 2A is a cross sectional view of the central collar of FIG. 2 illustrating the chain engaged within the vertical slot of the collar. Also illustrated is the horizontal threaded bore with the L-shaped handled rod threadably engaged therein.

FIG. 2B is an enlarged top view of the central collar of the invention illustrating the three attachment brackets for pivotal connection of the tripod support legs.

FIG. 5A is an enlarged bottom perspective view of the attachment coupler used for removable twist-lock attachment of the various food holding items such as the grill, the rotisserie unit, or the rotary shish kebob apparatus to the bottom end of the center rigid shaft.

DESCRIPTION OF A PREFERRED EMBODIMENT

Figure 1:
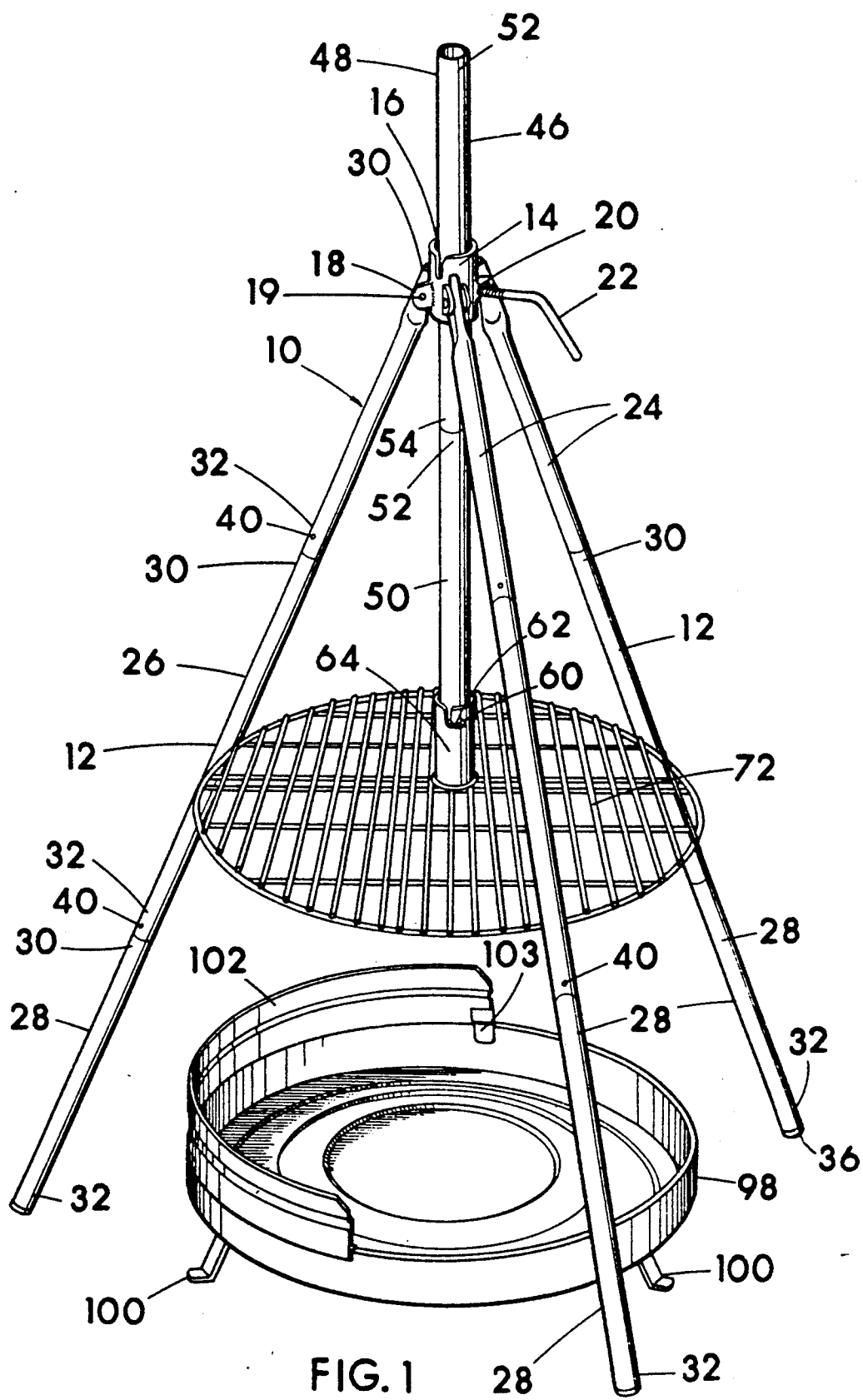
FIG. 1 is a perspective view of an example of the invention, depicting the tripod stand supporting the center rigid shaft, the lower end of which is affixed to an open wire grill. Also shown is the annular fire pan with attached wind breaker positioned below the grill.

Referring to the drawings in general, where the main embodiment of the invention is comprised of tripod stand 10 having three legs 12 each hingidly or pivotally affixed to a centrally positioned support collar 14. Legs 12 are preferably made of tubular metal, and collar 14 is preferably made of rigid cast metal for cost, strength, and heat resistance reasons. Collar 14 is comprised of an annular vertically oriented sidewall forming a tubular member which defines a main bore 44 extending therethrough. The upper open end of collar 14 contains a short vertical slot 16 for supporting a chain 45 which will be explained later in greater detail.

Affixed to the exterior of the annular sidewall primarily defining collar 14, adjacent the lower end thereof, are three brackets 18, the centers of which are each spaced evenly around collar 14 or approximately 120 degrees apart from the next bracket 18. Each bracket 18 is comprised of two vertical plates spaced apart from each other approximately and slightly than the thickness of diagonal edge 34 of leg segment 24 as may be ascertained from FIG. 2 B and 3. Each vertical plate of each bracket 18 has a central aperture 23 aligned with the aperture 23 of the closely adjacent vertical plate of the bracket 18.

Figures 3, 3A:
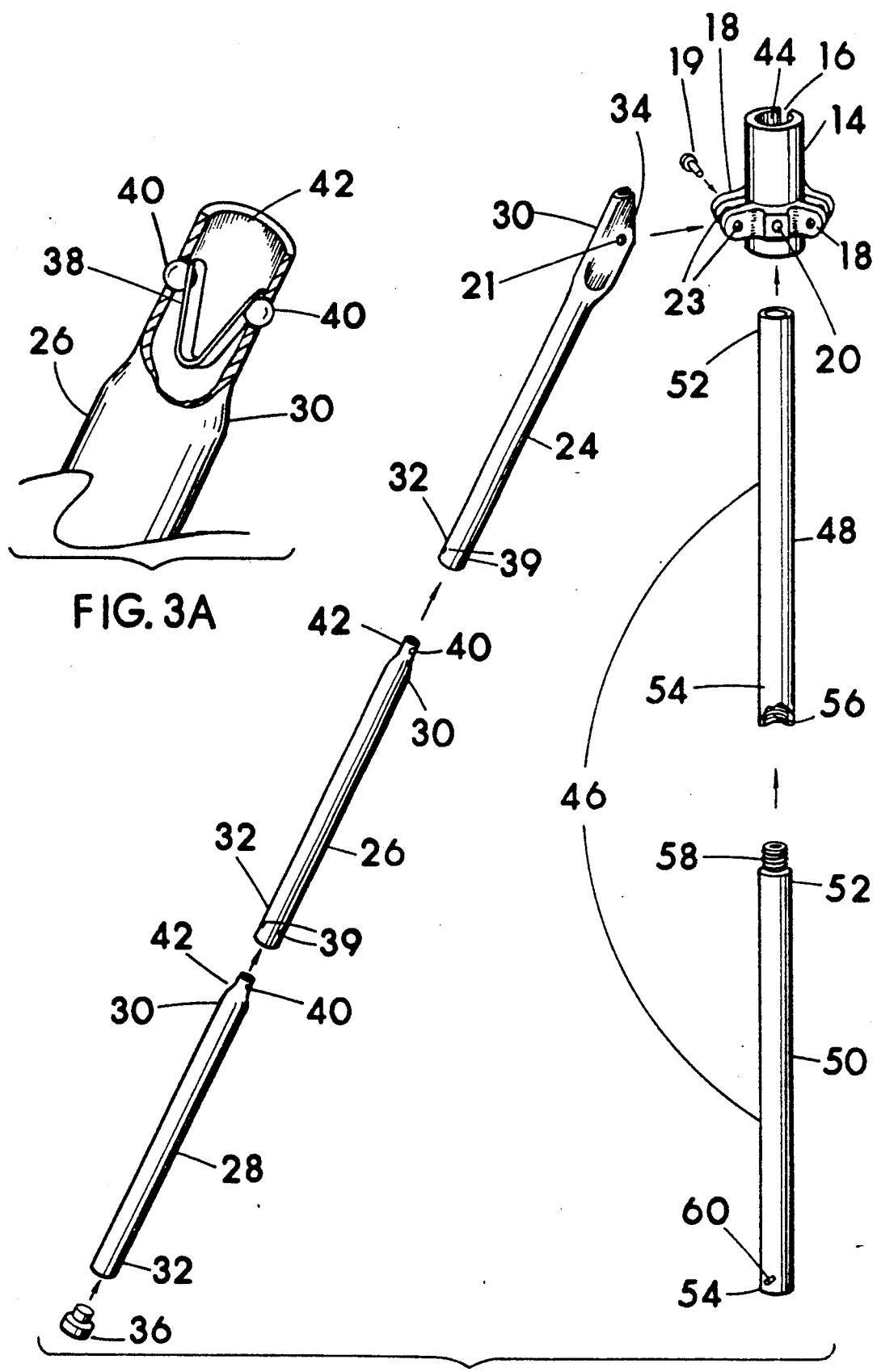
FIG. 3 is an exploded view of one support leg of the tripod stand, and a preferred two piece center rigid shaft, both positioned for attachment to the central collar.
FIG. 3A is an enlarged partial cut-away view of one end of a leg segment, illustrating the spring biased holding snap contained therein which allows individual leg segments to be removably affixed together to form a single elongated support leg.

Each leg 12 of tripod 10 is comprised of three separable interlocking segments of elongated rigid tubular members; a first or top leg segment 24, middle leg segment 26, and a third oz bottom leg segment 28. Each leg segment 24, 26, and 28 has a first end 30 and an oppositely disposed second end 32. A short section of first end 30 of each of the three first leg segments 24 is flattened and has one lengthwise edge cut diagonally, with the diagonal edge 34 angling upwardly and inwardly to terminate in a narrow apex shown best in FIG. 3. The flattened first end 30 of leg segment 24 also contains a central aperture 21 therethrough. The diagonal edge 34 of each first leg segment 24 is permanently and pivotally affixed one between the two plates forming brackets 18 on collar 14. The pivotal affixment of each leg segment 24 to a bracket 18 is inexpensively made by a rivet 19 passed through apertures 23 of brackets 18 and aperture 21 located in first end 30 of each first leg segment 24. Other attachment structures could be used other than rivets 19, such as nuts and bolts for example, to hingidly attach each leg 12 to collar 14. Diagonal edge 34 is positioned facing collar 14, and rivets 19 allows each first leg segment 24 to be pivoted outward and inward as desired, with the outward pivotal distance being limited by the abutment of the upper tip of diagonal edge 34 against the exterior surface of collar 14 located between each bracket 18 as may be ascertained from FIG. 1 and 2.

Second end 32 of first leg segment 24, is structured for releasable connection to first end 30 of middle leg segment 26, with second end 32 of middle leg segment 26 structured for releasable attachment over first end 30 of bottom leg segment 28. The bottom or distal end of each bottom leg segment 28 contains an end plug 36 preferably made of resilient plastic, shown in FIG. 3. End plug 36 serves to prevent accumulation of dirt inside of bottom leg segment 28, and to help prevent legs 12 from sinking into soft or wet soil. End plugs 36 also help prevent injury to the user and damage to deck surfaces by covering the sharp edges of the openings of second ends 32 of bottom leg segments 28.

Releasable attachment of leg segments 24, 26, and 28 to each other are provided by spring biased holding snaps. Each holding snap is comprised of a V-shaped spring 38 positioned within each end 30 of legs segments 26 and 28. The two terminal ends of spring 38 are apertured, with each aperture having residing therein, a ball 40, best shown in FIG. 3A. Spring 38 is positioned within a reduced diameter shouldered portion 42 located on first end 30 of middle leg segment 26 and bottom leg segment 28. Each reduced diameter shouldered portion 42 contains two oppositely disposed apertures through which balls 40 partially project. The diameter of balls 40 is greater than the diameter of the apertures in spring 38 in which they reside, and greater in diameter than the apertures within reduced diameter shouldered portion 42 through which they partially extend. Reduced diameter shouldered portion 42 of first end 30 of middle leg segment 26 releasibly inserts into second end 32 of first leg segment 24, and reduced diameter shouldered portion 42 of first end 30 of bottom leg segment 28 is sized for releasable insertion into second end 32 of middle leg segment 26. The shouldered or widest portion of reduced diameter shouldered portion 42 prevents excessive telescopic insertion of the leg segments into each other. Once connected, balls 40 of reduced diameter shouldered portion 42 can be rotatably aligned to project through corresponding apertures 39 in second ends 32 of first leg segment 24 and middle leg segment 26 so as to retain the leg segments together as may be ascertained from FIG. 1, 3 A and 3. To release leg segments 26 and 28 from connection with the corresponding leg segment 24 and 26 respectfully, each leg segment 26 or 28 is rotated slightly by hand, which depresses spring 38 and balls 40 dislodging the tips of balls 40 housed within the apertures 39. Each leg segment 26 and 28 is then simply pulled free from the connecting leg segment 24 and 26, respectfully, and spring 38 maintains balls 40 in place within reduced diameter shouldered portion 42 of first end 30 of leg segments 26 and 28. Other similar and readily available snap or compression type fittings are anticipated as being suitable for connecting the leg segments together. Tripod legs which are not separable into segments, but instead were capable of telescoping into short connected lengths would be suitable within the scope of the invention, however would probably be slightly more expensive to manufacture than the above described separable legs 12.

Legs 12 when fully assembled and attached to collar 14 may be separated from each other for increased stability of tripod 10 by way of outward pivoting on rivets 19 to set tripod 10 upright as shown in FIG. 1. With tripod 10 in the upright position, legs 12 extend angling outward from collar 14 with the outward angling providing widening spacing between each of the legs 12 for increased stability, while at the same time providing space between the legs 12 to place a fire and to suspend food holding equipment.

Main bore 44 of collar 14 is sized for removably retaining an elongated, vertically oriented rigid shaft 46. Shaft 46 is preferably made of metal such as steel for strength, cost, and resistance to heat. When shaft 46 is vertically oriented as shown in FIG. 1, the shaft has an upper end and a lower end, with the lower end being positioned centrally between legs 12, and the upper end being positioned above collar 14. The upper end of shaft 46 above collar 14 provides a convenient and always sufficiently cool place to grasp with one hand to push or pull on the shaft to make adjustments to the position of the lower end of shaft 46 over a fire, as will be appreciated with a continued reading.

Shaft 46 is preferably comprised of two hollow tubular separable sections, first shaft member 48 and second shaft member 50, this being for storage purposes. Each shaft member 48 and 50 has an upper end 52 and a lower end 54, with lower end 54 of first shaft member 48 structured for releasable connection with threads to upper end 52 of second shaft member 50 to form a single shaft 46. Lower end 54 of first shaft member 48 contains internal threads 56 sized for releasable connection with corresponding exterior threads 58 of upper end 52 of second shaft member 50, as may be ascertained from FIG. 3, although other connecting methods may be used. As stated earlier, shaft 46 is removably and slidably adjustably contained within main bore 44 of collar 14.

Centrally located between two of the three brackets 18 of collar 14 is a horizontally disposed threaded bore 20 extending through the annular sidewall of collar 14. Rotatably housed within threaded bore 20 is the threaded straight end of a rigid rod, with the oppositely disposed end of the threaded rod having an exposed handle structure, with the rod and handle designated L-shaped handle 22 in the drawings. The threaded end of L-shaped handle 22 advances into main bore 44 of collar 14 when handle 22 is rotated clockwise, and withdraws from bore 44 when rotated counterclockwise. Shaft 46 is retained within open bore 44 of collar 14 by L-shaped handle 22. When the proximal end of L-shaped handle 22 is advanced into threaded bore 20, it compresses against the exterior surface of shaft 46 and secures it releasably affixed in position.

Figure 5:
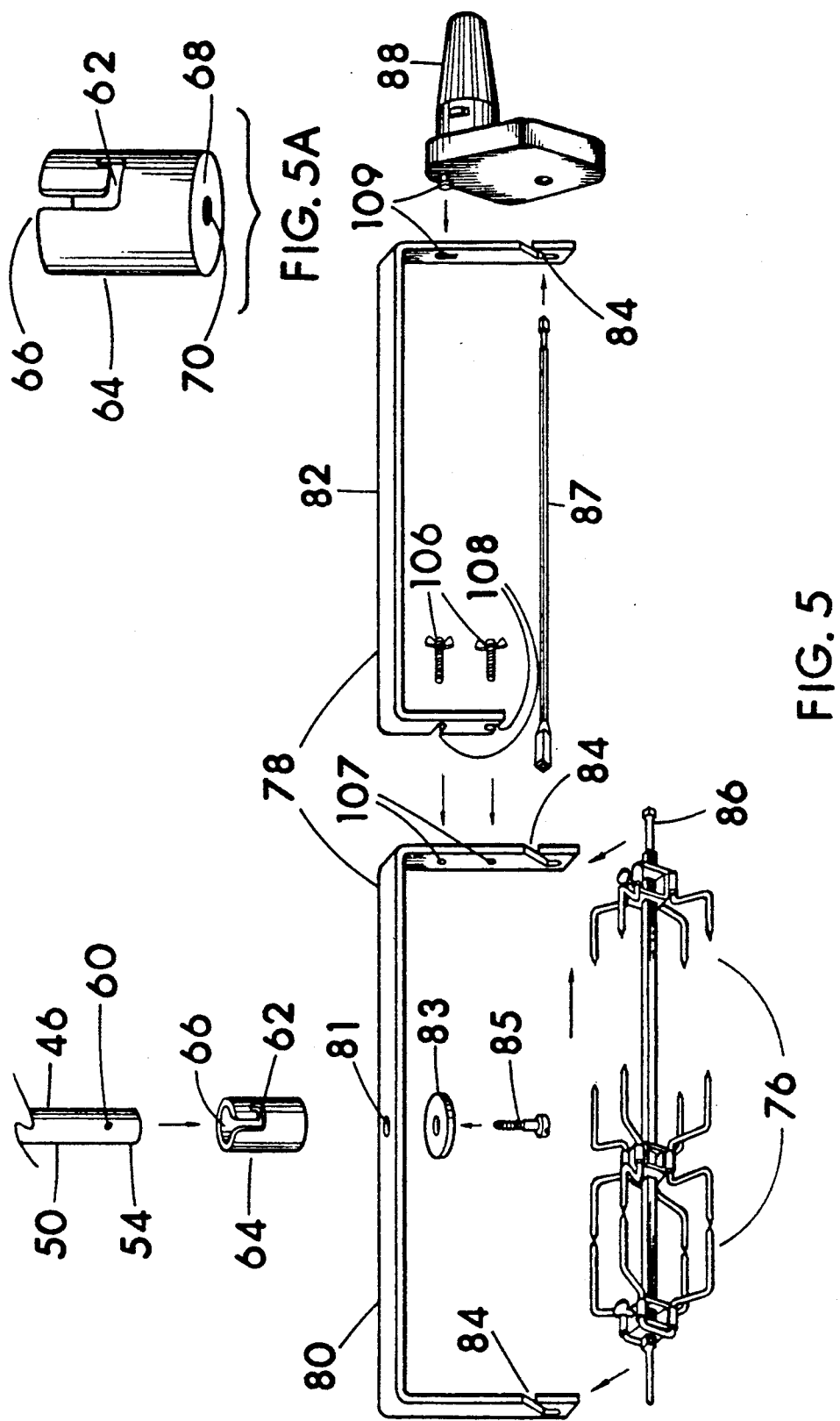
FIG. 5 is an exploded view of the component parts of the accessory rotisserie unit which is also attachable to the lower end of the center rigid shaft by a twist-lock connecting arrangement.

Lower end 54 of second shaft member 50 is structured for removably attaching to a variety of food holding attachments. A twist to attach, twist to detach locking structure which may be operated by hand without additional tools is preferred. My twist-lock attachment is comprised of a small, stationary pin 60 extending horizontally disposed from the side of the vertically disposed lower end 54 of second shaft member 50. Lower end 54 and pin 60 slip inside and interlock with an attachment coupler 64 having a specifically shaped groove 62 located in the annular sidewall forming attachment coupler 64. Attachment coupler 64 is a short hollow cylindrical member having an open top end 66 and an oppositely disposed closed bottom end 68 containing a threaded central aperture 70. The specifically shaped groove 62 is sized to receive pin 60. Groove 62 as shown in FIG. 5 A, extends from open top end 66 of coupler 64 vertically downward prior to turning about 90 degrees and extending horizontally for a short distance. The end of the horizontal section of groove 62 preferably turns back upward or vertically shortly prior to terminating, rendering a location in which pin 60 may reside until upward pressure is applied to attachment coupler 64 to bring pin 60 into the horizontal portion of groove 62 whereby with rotation of coupler 64, end 54 of shaft 46 and pin 60 may be withdrawn from groove 62 and coupler 64. Other readily removable attachment structures could be used within the scope of the invention.

One attachment coupler 64 is connected, and left connected to each accessory food holding attachments by a threaded bolt 85 through a food holding attachment and into threaded aperture 70, although couplers 64 could also be permanently affixed by other methods such as welding. Accessory food holding attachments currently include an open wire grill 72, a shish kebob cooking attachment 74 and rotisserie attachment 76. Grill 72 is comprised of a flat, annular metal framework, the center of which is affixed with attachment coupler 64, with closed bottom end 68 positioned adjacent grill as may be generally ascertained from FIG. 1. A bolt 85 and a washer are used for the connection.

Figure 4:
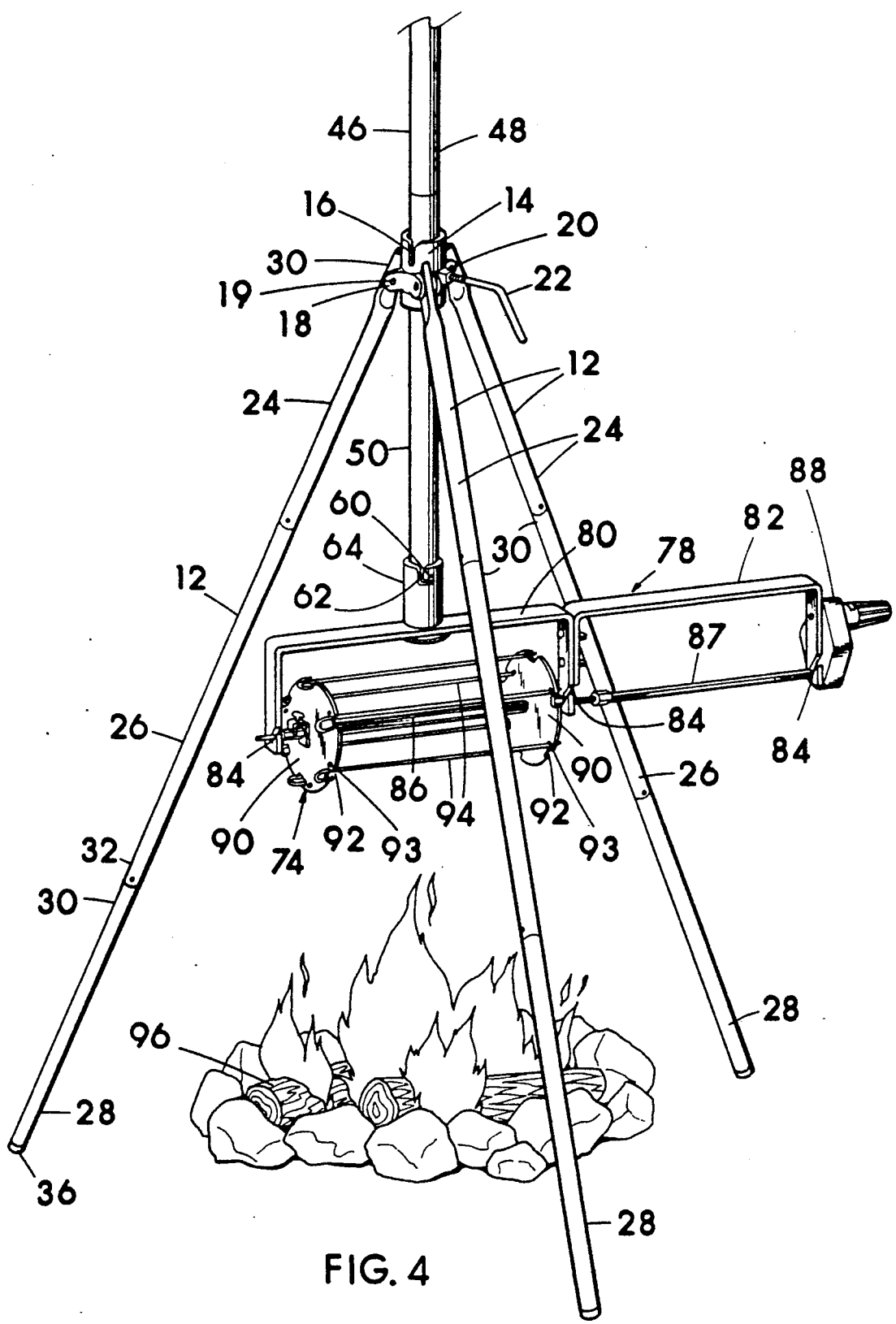
FIG. 4 is an in-use illustration of the cooking apparatus with an attached rotary shish kebob apparatus with battery powered motor over an open campfire.

Referring now mainly to FIG. 4 and 5. Shish kebob cooking attachment 74 and rotisserie attachment 76 are both supported by a two piece accessory attachment framework 78 having an affixed attachment coupler 64 for attachment thereof to center rigid shaft 46. One attachment frame 78 is used, with the frame 78 being readily switchable from being a shish kebob cooking attachment 74 to a more conventional rotisserie attachment 76. Accessory attachment framework 78 is basically comprised of two separable elongated sections of U-shaped metal brackets, designated first bracket 80 and second bracket 82, the two piece structuring being primarily to allow frame 78 to be easily stored. Bracket 80 has a central hole 81 for passage of bolt 85 therethrough for attachment of coupler 64. A washer 83 may be used between the head of bolt 85 and the underside of bracket 80 if desired. In any case, coupler 64 should be non-rotatably attached to bracket 80 or grill 72 for that matter.

Brackets 80 and 82 are endwardly releasably connectable to each other by winged-bolts 106 passed through notches 108 in bracket 82 and threadably engaged within threaded apertures 107 in one end of bracket 80. The terminal ends, and the central abutting ends of the attached together brackets 80 and 82 have rod support notches 84 which are structured to removably receive and rotatably support an elongated thin metal rod. The metal rod is comprised of two interlocking separable sections, first rod section 86 and second rod section 87. One end of rod section 87 has a square socket sized for receiving a square head at one end of rod section 86. The square socket of rod 87 removably retains the square head of rod 86 to interlock rotation in the rods 86 and 87. Both rods 86 and 87 are mostly square to allow stationary affixment of rotisserie attachments 76 and support plates 90 of the shish kebob cooking attachment 74 each of which have attachment collars with square center apertures for the insertion of rod section 86 therethrough, and to retain the attachments 74 and 76 non-rotatable on the rod 86. The areas of rod sections 86 and 87 which reside in support notches 84 are round to allow smooth rotating of the rods within the notches 84. The terminal ends of both rods 86 and 87 extend shortly beyond both ends of accessory attachment framework 78 when in use. The end of second rod 87 extending from the end of second bracket 82 is structured for removable plug-in connection to motor 88. As may be ascertained from FIG. 5, motor 88 removably attaches by hook-on attachment 109 comprising a pin having an enlarged head attached to a front face of motor 88 which removably drops into a keyhole shaped aperture in the terminal end of bracket 82. The two point connection of motor 88 at attachment 109 and to one end of rod 87 prevents motor 88 from rotating when rotating rods 87 and 86. Motor 88 is preferably a battery powered motor having a gear reduction for easy use when outdoors and at the proper rotation speed for cooking.

Rotisserie attachment 76 and shish kebob attachment 74, can be releasably affixed to accessory attachment framework 78 by way of rod 86. Rotisserie attachment 76 is comprised of two outer four-pointed prong units, each of which is structured for removable attachment by thumbscrews through slidable collars having square apertures to first rod 86. The two four-prong units may be used by themselves to support a single piece of meat such as a chicken. An optional center eight-prong unit is also provided which may be slipped onto rod 86 between the two outer four-prong units as shown in FIG. 5, this being to allow the cooking of two separate pieces of meat if desired. Since the rotisserie attachment 76 can be slidably affixed onto first rod 86, they can be adjusted in distance from one another to accommodate varying sizes of meat or other food.

With rotisserie attachments 76 removed from rod 86, shish kebob attachment 74 may be removably attached to first rod 86. Shish kebob attachment 74 shown in FIG. 4, is comprised of two separate flat annular support plates 90, each having an affixed central collar having a square aperture and attached thumbscrew for insertion of first rod 86 and stationary affixment thereto. Each support plate 90 also has a series of recesses 92 evenly spaced around the outer edge. Each recess 92 is a generally rectangular indention with a small circular aperture 93 positioned beside it. Each recess 92 is sized for removably retaining one end of an elongated metal skewer 94. Skewer 94 has a pointed end and an oppositely disposed looped end adapted for easy handling with the thumb and forefinger. The loop of skewer 94 is releasably snapped into the rectangular indention of recess 92 of one support plate 90, while the opposite pointed end of the same skewer 94 is inserted into aperture 93 adjacent recess 92 of the second or oppositely disposed support plate 90. A number of skewers 94 can be retained onto the two opposing support plates 90, and used to retain small 10 pieces of meat oz other food. Motor 88 can be used to rotate eIther shish kebob attachment 74 or rotisserie attachment 76, through rods 86 and 87, when affixed to accessory attachment framework 78. A second important purpose of second bracket 82 is to position motor 88 a sufficient distance away from the source of heat to prevent damage to the motor 88.

As mentioned above, and as may be ascertained from FIG. 2 and 2 A, main bore 44 of collar 14 is structured with a vertical slot 16 for removably and adjustably retaining a length of linked chain 45 by engagement of one link edgewise within the slot 16. Slot 16 is exposed for use by the removal of center rigid shaft 46 from collar 14. The adjacent link in chain 45 which is turned 90 degrees from the link residing in slot 16, prevents chain 45 from sliding through slot 16. Chain 45 may hang down through the interior of open bore 44 of collar 14 with the distal end of chain 45 having an attached hook 49 used to support accessory cooking utensils such as a large cooking pot 47 when desired.

Figure 6:
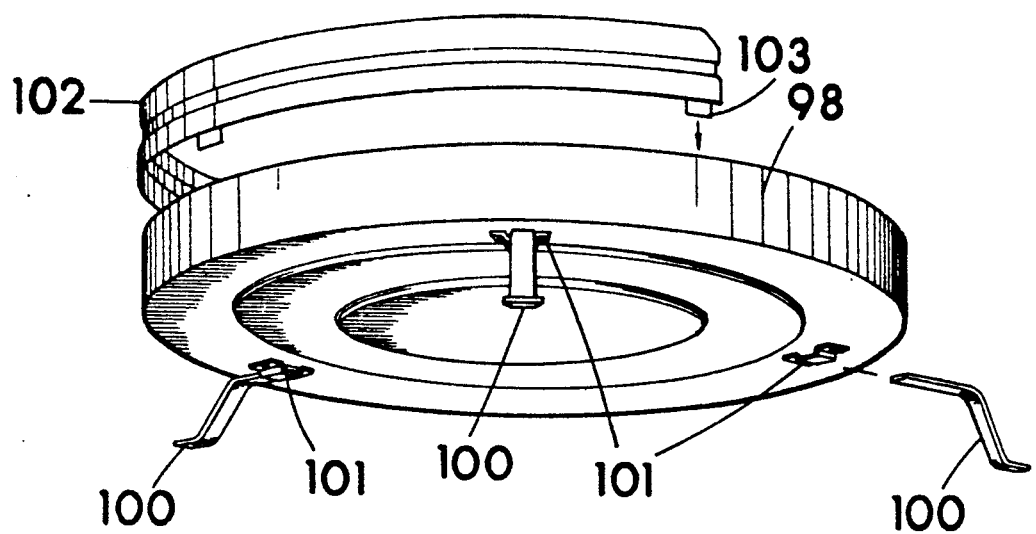
FIG. 6 is a bottom view of the fire pan showing the detachable support legs thereof. Also shown is the wind breaker detached from the upper sidewall of the fire pan.

Tripod 10 can be positioned over an open campfire 96, as shown in FIG. 4, or it can be positioned over a contained fire, such as that made with charcoal briquettes in metal fire pan 98. Fire pan 98 is comprised of a annular dish having low annular sidewall, and removable metal legs or supports 100, shown in FIG. 6. Supports 100 suspend fire pan 98 off the surface of the ground or supporting surface, such as a wooden deck. Each support 100 is removably inserted into receiver slots 101 located on the bottom surface of fire pan 98. Fire pan 98 also has an optional removable wind breaker 102, shown in FIG. 1 and 6. Wind breaker 102 is comprised of a short curved metal band having three downward extending tabs 103 affixed to the interior lower side thereof. The outer lower edge of wind breaker 102 fits over the outside of the annular sidewall of pan 98, and tabs 103 fit inside the annular sidewall to retain wind breaker 102 in place. Wind breaker 102 may be slidably repositioned at will on fire pan 98, or removed therefrom and positioned inside fire pan 98 for storage therein. The positioning of wind breaker 102 within pan 98 is provided by manufacturing wind breaker 102 out of thin somewhat flexible metal. Wind breaker 102 helps to protect the fire from the wind, which might extinguish a small fire or blow up ashes onto the food contained on grill 72.

Figure 7:
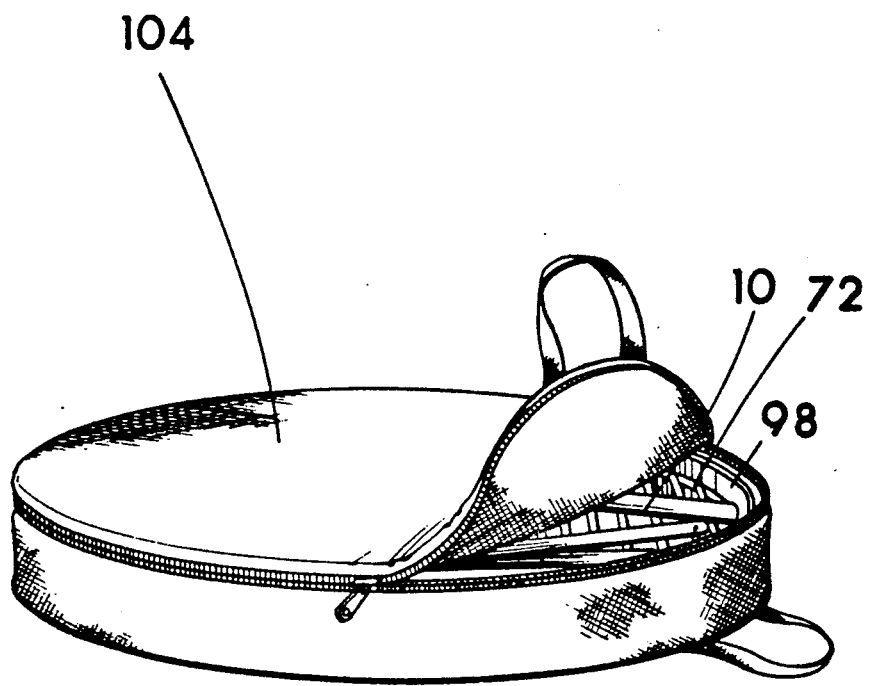
FIG. 7 illustrates the disassembled cooking apparatus inclusive of the central collar and legs, the center rigid shaft, the grill, the rotisserie unit, the rotary shish kebob apparatus, the fire pan and wind breaker, and pot support chain all stored within a fabric carrying case. The optional cooking pot shown in FIG. 2 is not inside of the carrying case.

The interlocking sections of tripod 10 can be disassembled into segments small enough to fit into the interior of fire pan 98, along with grill 72, shish kebob attachment 74 and rotisserie attachment 76. Fire pan 98, along with all disassembled sections, are inserted into a handled carrying case 104 shown in FIG. 7. Carrying case 104 is sized slightly larger than fire pan 98 and consists of a heavy, durable material lined with a protective water repellant lining to prevent leakage or passage of grease or soot from the interior of carrying case 104. The interior of carrying case 104 is accessible with a zippered top panel, as shown in FIG. 7, which allows easy insertion of fire pan 98. Carrying case 104 is also affixed with handles for easy carrying. Pot 47 is optional, and a cooking pot 47 as large as that shown in FIG. 2 will not fit within carrying case 104.

One of the major advantages of this portable cooking apparatus is the unique and stable support and attachment of the food holding attachments. This is provided by shaft 46 which is held vertically and laterally stable by collar 14. The wind will not affect the position of the suspended attachments, nor will off center placement of food items or utensils cause tilting of grill 72. The use of coupler 64 also prevents unwanted horizontal rotation of the affixed accessory attachments in the wind, or when turning or flipping food. All parts can be assembled and disassembled quickly and easily without the use of tools other than human hands. Shish kebob attachment 74 allows a number of skewers 94, with attached food, to be rotated all at the same time by motor 88. This provides more even cooking and prevents burning of the food. It also eliminates the need for the cook to constantly attend and turn the shish kebobs. Shaft 46 also allows a wide range of available height adjustments of accessory attachments 72, 74 and 76, to compensate for various sizes of fires. This invention is particularly useful as an outdoor portable camping cooking apparatus. All parts can be easily stored in a small compact unit which can be inserted into the convenient carrying case 104.

Although I have very specifically described the preferred structures of the invention, it should be understood that the specific details are just that, "preferred" structures given for example to those skilled in the art. Many minor changes in the specific structures described may obviously be made without departing from the spirit of the invention, and therefore it should be understood that the scope of the invention is not to be limited by the specification and drawings given for example, but is to be determined by the spirit and scope of the appended claims.

What I claim as my invention:

1. In combination, a cooking apparatus for supporting food over a fire, comprising, at least three elongated support legs, one end of each of said support legs attached to a collar, each of said support legs extending angling outward from said collar with said angling providing widening spacing between each of said support legs, said collar further defining a main bore, said main bore containing a substantially rigid elongated shaft, said shaft vertically oriented and having an upper end and a lower end, said lower end of said shaft positioned generally centrally between said support legs, said shaft sized and shaped relative to said main bore to provide selectable vertical positioning of said shaft within said main bore, affixment means providing releasable stationary affixment of said shaft within said main bore, a food holding means attached to said lower end of said shaft, said food holding means vertically positionable by way of said selectable vertical positioning of said shaft within said main bore.

2. A combination according to claim 1 wherein each of said support legs is structured of a plurality of separable segments releasably connected together.

3. A combination according to claim 2 wherein said support legs are hingidly attached to said collar at substantially evenly spaced intervals around said collar.

4. A combination according to claim 3 wherein said affixment means providing releasable stationary affixment of said shaft within said main bore, includes a threaded bore through said collar with said threaded bore opening into communication with said main bore containing said shaft, said threaded bore containing a threadably engaged handled rod providing means to press against said shaft thereby retaining said shaft stationary.

5. A combination according to claim 4 wherein said shaft is structured of at least two separable segments releasably connected together.

6. A combination according to claim 5 wherein said food holding means attached to said lower end of said shaft is removably attached to said shaft.

7. A combination according to claim 6 wherein said food holding means removably attached to said lower end of said shaft is a battery powered rotary shish kebob cooking apparatus.

8. A combination according to claim 6 wherein said food holding means removably attached to said lower end of said shaft is a battery powered rotisserie.

9. A combination according to claim 6 wherein said food holding means removably attached to said lower end of said shaft is a grill.

10. A combination according to claim 9 wherein said grill is removably attached to said lower end of said shaft by a twist to attach, twist to detach locking connection means comprising an outwardly extending pin on a side of said lower end of said shaft, and a tubular member affixed centrally to said grill, said tubular member having a slot in a sidewall thereof, said slot extending vertically and then turning horizontally, said tubular member sized to fit over said lower end of said shaft with said extending pin fitted within said slot.

11. In combination, a cooking apparatus having means for supporting food over a dish shaped fire pan, said cooking apparatus further having means providing disassembly and storage thereof within said fire pan, said fire pan sized for storage within a handled carrying case, said fire pan when containing a disassembled cooking apparatus and stored within said handled carrying case being suitably light in weight to be carried by a human;

said cooking apparatus comprising, at least three elongated support legs each structured of a plurality of separable segments releasably connected together, one end of each of said support legs hingidly attached to a collar, each of said support legs extending angling outward from said collar with said angling providing widening spacing between each of said support legs, means limiting said angling outward of said support legs, said collar further defining a main bore, said main bore removably containing a substantially rigid elongated shaft, said shaft vertically oriented and having an upper end and a lower end, said lower end of said shaft positioned generally centrally between said support legs, said shaft sized and shaped relative to said main bore to provide selectable vertical positioning of said shaft within said main bore, affixment means providing releasable stationary affixment of said shaft within said main bore, a food holding means removably attached to said lower end of said shaft, said food holding means vertically positionable by way of said selectable vertical positioning of said shaft within said main bore.

12. In combination, a cooking apparatus for supporting food over a fire, comprising, at least three elongated support legs, one end of each of said support legs attached to a central support member, each of said support legs extending angling outward from said central support member with said angling providing widening spacing between each of said support legs, said central support member further defining a main opening, said main opening containing a substantially rigid elongated shaft, said shaft vertically oriented and having an upper end and a lower end, said lower end of said shaft positioned generally centrally between said support legs, said shaft sized and shaped relative to said main opening to provide selectable vertical positioning of said shaft within said main opening, affixment means providing releasable stationary affixment of said shaft within said main opening, a food holding means attached to said lower end of said shaft, said food holding means vertically positionable by way of said selectable vertical positioning of said shaft within said main opening.

13. A combination according to claim 12 wherein said central support member further includes means providing said cooking apparatus with adjustable chain attachment means for supporting a cooking pot over a fire.

* * * * *